July 12, 1949.  W. AUER ET AL  2,476,019
EXPANSION REAMER
Filed Oct. 1, 1946
Fig. 1.
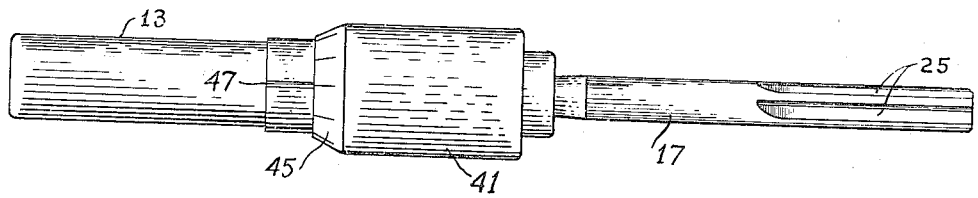
Fig. 2.
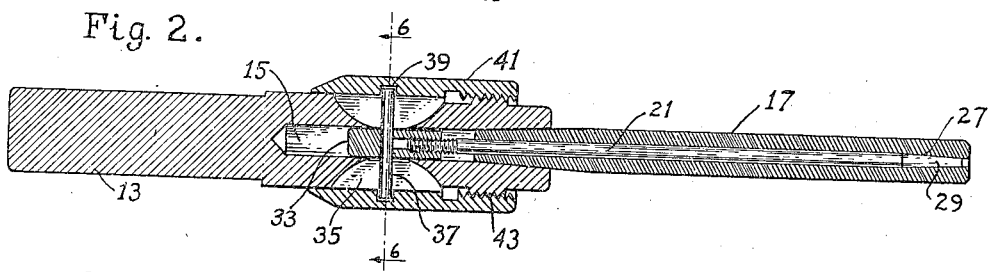
Fig. 3.
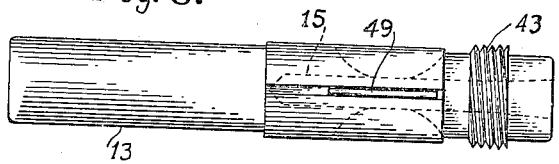
Fig. 4.
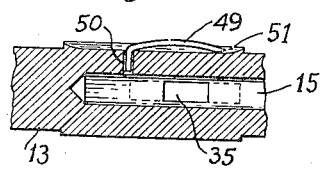
Fig. 5.
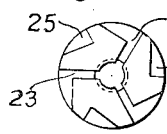
Fig. 6.
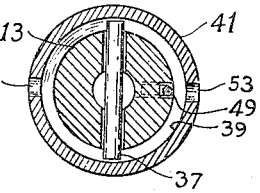
Fig. 7.
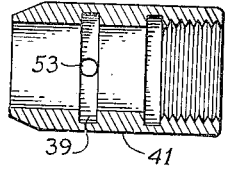
Fig. 8.
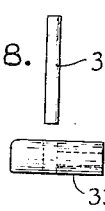
Fig. 9.
Fig. 10.
Fig. 11.
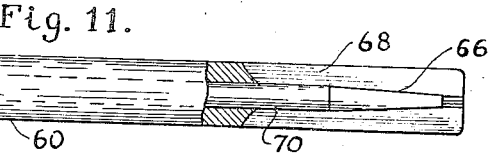
Fig. 12.
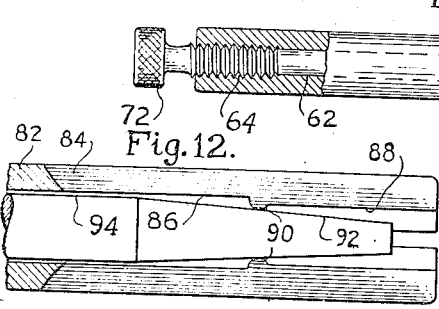
INVENTORS
William Auer and Paul E. John
BY Charles Shepard
their Attorney.

Patented July 12, 1949

2,476,019

UNITED STATES PATENT OFFICE 2,476,019

EXPANSION REAMER

William Auer and Paul E. John, Irondequoit, N. Y.

Application October 1, 1946, Serial No. 700,594

8 Claims. (Cl. 77—76)

This invention relates to expansion reamers of the kind adapted to be used in a drill press or other machine tool for reaming a hole already bored, to the exact size required.

The object of the invention is the provision of a reamer of this kind which is strong and durable and which is particularly adapted for reaming holes much smaller than can be done by expansion reamers now in use.

Another object of the invention is the provision of a reamer of this kind in which the cutters are formed integrally with the arbor and are adjustable radially thereof.

Still another object of the invention is the provision of a reamer of this kind adapted for reaming very small holes and in which the cutters may be accurately adjusted within certain limits, means being provided for indicating the extent of such adjustment.

A further object is the provision of an improved expansion reamer construction which, although usable in reamers of larger diameter, is especially suitable for reamers of very small diameter, and which will permit the reaming of a small diameter hole all the way to the bottom of the hole.

These and other desirable objects are accomplished by the construction disclosed as an illustrative embodiment of the invention in the following description and in the accompanying drawings forming a part hereof, in which:

Fig. 1 is a side elevation of an expansion reamer constructed according to one possible embodiment of the invention;

Fig. 2 is a central longitudinal section through the same;

Fig. 3 is a side elevation of the body with other parts removed;

Fig. 4 is a fragmentary section showing in detail devices for retaining the adjusting sleeve in adjusted position;

Fig. 5 is an end view of the cutter;

Fig. 6 is a transverse enlarged section taken substantially on the line 6—6 of Fig. 2;

Fig. 7 is a longitudinal section through the adjusting sleeve, showing details of the interior;

Figs. 8, 9, and 10 are views of a cross pin, slide block, and taper pin, respectively, which interfit with each other, these three views being arranged to form a single "exploded" view of the construction;

Fig. 11 is a side elevation of an expansion reamer illustrating another possible embodiment of the invention, parts being sectioned away to expose details of the construction; and Fig. 12 is a longitudinal section through a fragment of a reamer, showing a modified construction of the forward end.

The same reference numerals throughout the several views indicate the same parts.

Expansion reamers as heretofore constructed have been incapable of reaming very small openings, and, in the smallest commercially available sizes, have been incapable of reaming all the way to the bottom of a hole which does not go entirely through the work piece. The present invention is intended especially for use in small openings, although it is not limited to such use. The expansion reamer of the present invention has been used successfully for reaming holes down to 0.125 of an inch in diameter, and could be used for even smaller holes, down to the neighborhood of about 0.093 of an inch, if desired, and the present reamer will ream all the way to the bottom of a hole which does not go through the work. Owing to the small sizes of the parts, they are shown much enlarged and somewhat exaggerated in the drawings, so that the construction may be more easily understood.

Referring to Figs. 1 to 10 of the drawings, a preferred form of the reamer is illustrated, comprising a main body or reamer chuck 13 having a circular cylindrical end or shank adapted to be held in the chuck of a drill press, lathe, or other machine tool. The right end of the body, as seen in the drawings, is bored at 15 to form an axial opening therein and the outer end of said opening is tapered for receiving the arbor or reaming cutter 17. The arbor 17 has a central opening extending therethrough longitudinally for the reception of an expansion bar in the form of a taper pin 21 movable longitudinally therein.

The cutting end of the arbor is provided with a plurality of radial slots 23 communicating with the central opening therein and arranged equidistantly from each other. In the present instance, three of the slots are shown, arranged at substantially 120° from each other. Adjacent to and intermediate each successive pair of slots 23, the outer wall of the cutter is fluted, as seen at 25, thus providing six cutting edges on the periphery of the tool, although the exact number of cutters is not an essential part of the invention.

It will be noted by an inspection of Fig. 5 that cutting edges are thus provided arranged circumferentially of the arbor and integral therewith. Adjacent its outer end, the bore of the arbor is tapered, as clearly shown at 27 in Fig. 2. The outer end of the taper pin 21 has a tapered portion 29 which is operable to expand the periphery of the cutters when the bar moves longitudinally into engagement with the tapered end of the bore therein. The cutters are expanded radially outward when the tapered end of the expansion bar or taper pin engages the inner inclined walls of the cutters and cams them radially outward to increase the diameter of the operating surface. When the expansion bar is withdrawn the cutters automatically contract due to the resiliency of the material. The taper pin 21 is of such length that it does not project beyond the end of the cutter even when the taper pin is moved longitudinally to expand the cutter to its greatest diameter; hence the cutter may be used to ream a hole all the way to the bottom.

Means are provided for moving the taper pin longitudinally in the arbor to adjust the diameter of the hole being reamed, without the necessity of taking the shank of the reamer out of the chuck in which it is mounted. To this end, the taper pin 21 is threaded at its inner end at 31 to screw tightly into a tapped longitudinal bore in the slide block 33 which has a snug sliding fit in the longitudinal bore 15 of the main body. Arranged with a snug sliding fit in a transverse or diametrical bore in the slide block 33 is a cross pin 37 which projects at both ends from the block 33, through milled slots 35 in the main body, into an internal circumferential groove 39 in the wall of the adjusting sleeve 41. The sleeve 41 is revolvable on the body and is threaded internally at its outer end to engage a helical screw thread 43 on the body adjacent its outer end. Rotation of the sleeve 41 in one direction or the other moves it longitudinally of the body by its engagement with the thread 43, and moves the cross pin 37 by its engagement with its opposite ends, and thus moves the taper pin 21 connected therewith.

Means are also provided for indicating the extent of rotation of the sleeve 41 and consequently the extent of movement of the taper pin and the degree of expansion imparted to the cutters. To this end, the sleeve 41 is beveled at its inner end and graduated to provide a scale 45 adapted to cooperate with a fixed index mark 47 on the body 13.

In order to prevent accidental rotation of the sleeve 41, after the parts have been accurately adjusted, means are provided to frictionally engage the sleeve, and retain it in adjusted position. Said means comprises a fine piano wire 49 having one end anchored by extending approximately radially into an opening 50 provided in the body, the remainder of the wire extending along a shallow groove 51 in the body within the sleeve 41, this longitudinal part of the wire being slightly bent or bowed as seen in Fig. 4 so that it presses outwardly against the inner surface of the adjusting sleeve 41 and thus acts as a frictional detent for the sleeve. The wire 49 and the groove and opening in which it is mounted are conveniently of a diameter of about 0.020 inch. One end of the groove 51 conveniently serves also as the index mark 47.

The slots or openings 35 which limit the movement of the sleeve, and hence the movement of the taper pin, are preferably formed by milling into the body from diametrically opposite points as shown in Fig. 2, but are of comparatively short length at the center as seen in Fig. 4 of the drawings.

In assembling this reamer, the slide block 33 with the taper pin 21 screwed into it, is inserted in the opening 15 in the body, and the sleeve 41 is positioned thereon by a movement from the inner or upper end of the body to engage the retaining wire 49 and bend it into the groove provided therefor. The sleeve may then be turned until the diametrically opposite openings 53 in the sleeve register with the slots 35 and with the transverse opening in the block 33, whereupon the pin 37 may be inserted through one of the openings 51 through the slots 35 and through the transverse opening in the block 33, thus operatively connecting the rod 21 with the sleeve 41. The openings 53 communicate with the internal groove 39 in the sleeve 41 and rotation of the sleeve causes the opposite ends of the pin 37 to enter said groove and retains the pin in the position shown. The externally tapered end of the cutter or arbor 17 is now thrust axially over the pin 29 and is shoved into the tapered opening in the outer end of the main body and is tapped lightly to seat it firmly and non-rotatably in the main body. This external taper on the cutter (and internal taper in the main body) is preferably at the rate of about ¼ inch to a foot. The taper 29 at the end of the taper pin 21 is preferably a taper of about 3 degrees, which enables a fine adjustment of the effective diameter of the reamer through a range, for example, of about 0.003 inch in a reamer of a nominal size of 0.125 inch.

Referring now to that embodiment of the invention illustrated in Fig. 11 of the drawings, an expansion reamer is illustrated, having an arbor 60 provided with a longitudinal opening 62 which is threaded at its inner end, as at 64. The outer end of the opening is tapered at 66, and slotted at 68 and grooved or fluted to form a cutter similar to that previously described. Arranged in the opening in the arbor is an expansion rod or taper pin 70 tapered at its outer end to cooperate with the tapered inner walls of the cutters at the outer end of said opening. Adjacent its inner end, the expansion rod is threaded to cooperate with the threads 64 on the inner wall of the opening in the arbor, and at its end is provided with a finger piece or knob 72 whereby the expansion rod may be manually rotated. The finger piece 72 is of a smaller diameter than the arbor so that it does not interfere with the setting of the arbor in a chuck. When the finger piece is turned in one direction or the other, the expansion rod is moved in one direction or the other to expand the cutting end of the arbor or to permit it to contract by virtue of its resiliency.

This second embodiment of the invention, like the first embodiment, comprises a simple and sturdy construction, well adapted to very small expansion reamers of diameters less than those heretofore thought possible. The first embodiment has the advantage that the diameter of the reamer may be adjusted without removing the reamer from the chuck of the drill press or other machine tool. The second embodiment is somewhat simpler and less expensive, but when its diameter is to be adjusted it must be taken out of the chuck in order to obtain access to the adjusting knob 72.

In both embodiments described above, the expansion rod or taper pin has its forward end tapered, and the outer end of the opening through the arbor or cutter is also tapered. It is not necessary to have the arbor opening tapered in all cases, however. In fact, even better results are frequently secured when the arbor opening is provided with an internal ridge or shoulder extending circumferentially around the opening so as to make a definite line-contact with the taper pin. Such a construction is illustrated in Fig. 12, in which a fragment of the arbor is shown diagrammatically at 82, the forward end thereof being fluted to provide cutting edges as before and being slitted at 84 for easy expansion. The longitudinal bore through the arbor, instead of being tapered at its forward end, is of cylindrical form with two portions, one of larger diameter as indicated at 86, and the other of smaller diameter as indicated at 88, with a ridge or shoulder between them, the shoulder preferably being rounded or in the nature of a bead, such as shown at 90, extending circumferentially around the bore and providing a definite line-contact engagement with the tapered portion 92 of the taper pin 94.

With this arrangement, a more accurate adjustment of the size of the reamer is possible. As the taper pin 94 is moved longitudinally in one direction or the other, the contact between the taper pin and the expanding portion of the arbor or cutter is always made at the location of the bead 90, even when the cutter is expanded to its maximum size, and thus the extent of expansion or contraction of the reamer remains substantially a straight line function of the longitudinal movement of the taper pin 94.

This alternative construction of the bore through the arbor or cutter may be used either as a modification of the construction above described in connection with Figs. 1–10 or as a modification of the construction above described in connection with Fig. 11. For many purposes the preferred construction is the one shown in Figs. 1–10 modified, however, by using the shouldered or line-contact form of bore as shown in Fig. 12, rather than the plain taper bore shown in Fig. 2.

It is seen from the foregoing disclosure that the above-mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. An expansion reamer including tubular means having a longitudinally slitted portion near its forward end so that said slitted portion may expand to a larger diameter, a plurality of cutting edges formed integrally on said slitted portion, said slitted portion being internally formed to cooperate with an externally tapered rod, an expansion rod movably mounted within said tubular means and having a tapered portion for cooperation with said formed portion of said tubular means to expand said slitted portion of said tubular means when said expansion rod moves longitudinally in one direction in said tubular means, said tubular means having a portion near its rear end adapted to be encircled by a chuck or the like to turn said tubular means during a reaming operation, and screw threaded means externally accessible at a point between said chuck-encircled portion and said slitted portion for adjusting said expansion rod longitudinally in said tubular means.

2. An expansion reamer as described in claim 1, in which said tubular means includes a slitted tubular member and a separate adapter chuck having a shank adapted to be inserted in a chuck of a machine tool and an opening for receiving the rear end of said tubular member, and in which said screw threaded means includes a sleeve rotatably mounted on said adapter chuck in screw threaded engagement therewith, and an operative connection between said sleeve and said expansion rod.

3. An expansion reamer including an adapter chuck having at its rear end a shank adapted to be mounted in a chuck of a machine tool, and having an axial bore with a tapered portion at its forward end, a tubular cutter member having a tapered rear end fitting tightly in said tapered portion of said axial bore and having its forward end slitted to provide expansible portions internally formed to cooperate with a control member, cutting edges formed integrally on said expansible portions, a control rod movable longitudinally in said tubular member, said control rod having near its forward end a tapered portion cooperating with said internal formation of said expansible portions of said tubular member to vary the effective diameter of said cutting edges upon axial movement of said control rod, the rear end of said control rod projecting beyond the rear end of said tubular member and into said bore of said adapter chuck, a slide block mounted for longitudinal movement in said bore and operatively connected to said control rod, a sleeve rotatably mounted on said adapter chuck and having screw threaded engagement therewith so that said sleeve is moved axially upon rotation relative to said adapter chuck, and an operative connection between said sleeve and said slide block to move the latter axially in said bore in response to the axial movements of the former.

4. In an expansion reamer, the combination of a body adapted to have its rear end mounted in a chuck, said body near its forward end being hollow and internally tapered, an arbor having a portion near its rear end externally tapered and adapted to be inserted into and frictionally and detachably secured in the internally tapered part of said body, expansible cutters on said arbor, means on said body for expanding said cutters, said means including a manipulating part externally accessible on said body forwardly of the point where said body is mounted in said chuck, and graduated scale means for indicating the degree of expansion.

5. In an expansion reamer, the combination of a body adapted to be mounted in a chuck, said body near its forward end being hollow and internally tapered, an arbor having a longitudinal opening therein and having a portion near its rear end externally tapered and adapted to be inserted into and frictionally and detachably secured in the internally tapered part of said body, expansible cutters on said arbor, a rod movable in the opening in said arbor for expanding the cutters, a pin arranged diametrically in said body, projecting therefrom and connected with said rod, a sleeve having an annular groove engaging the ends of said pin, and screw means for moving the sleeve axially to operate said rod.

6. An expansion reamer in accordance with claim 5, further including a longitudinal groove in said body, and a resilient wire arranged in said groove and anchored in said body to resiliently engage the inner wall of the sleeve to retain it in adjusted position.

7. An expansion reamer in accordance with claim 5, further including a groove in said body arranged longitudinally thereof, a resilient wire arranged in said groove and anchored therein to resiliently engage the inner wall of the sleeve to retain it in adjusted position, and a scale on said sleeve cooperating with said groove for indicating the extent of rotation of the sleeve.

8. An expansion reamer including an adapter chuck having at its rear end a shank for mounting in a chuck of a machine tool, and having an axial bore in its forward portion, a tubular cutter member having a rear end fitting tightly in said bore of said adapter chuck and having its forward end slitted to provide expansible portions, cutting edges formed integrally on said expansible portions, a control rod movable longitudinally in said tubular member, said control rod having near its forward end a tapered portion cooperating with the inner surfaces of said expansible portions of said cutter member to vary the effective diameter of said cutting edges upon axial movement of said control rod, the rear end of said control rod projecting beyond the rear end of said tubular cutter member and into said bore of said adapter chuck, a slide block mounted for longitudinal movement in said bore and operatively connected to said control rod, a sleeve rotatably mounted on said adapter chuck and having screw threaded engagement therewith so that said sleeve is moved axially upon rotation relative to said adapter chuck, and a connection between said sleeve and said slide block to move the latter axially in said bore in response to the axial movements of the former.

WILLIAM AUER.
PAUL E. JOHN.

REFERENCES CITED

The following references are of record in the file of this patent:

UNITED STATES PATENTS

| Number | Name | Date |
|---|---|---|
| 953,282 | Nash | Mar. 29, 1910 |
| 1,890,052 | German | Dec. 6, 1932 |
| 2,138,897 | Anthony | Dec. 6, 1938 |
| 2,355,965 | Frishette | Aug. 15, 1944 |